Jan. 20, 1959 J. T. A. VAN LOTTUM 2,870,261
ARRANGEMENT OF SUBSCRIBERS' CIRCUITS IN ELECTRONIC TELEPHONE EXCHANGES
Filed June 21, 1956
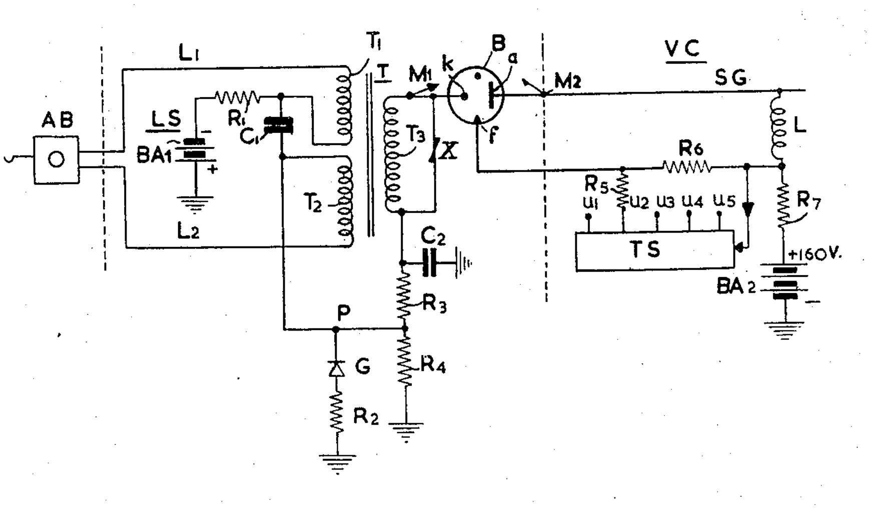
INVENTOR
JOHANNES THEODORUS ANTONIUS VAN LOTTUM
BY Fred M. Vogel
AGENT

United States Patent Office 2,870,261
Patented Jan. 20, 1959

2,870,261

ARRANGEMENT OF SUBSCRIBERS' CIRCUITS IN ELECTRONIC TELEPHONE EXCHANGES

Johannes Theodorus Antonius van Lottum, Eindhoven, Netherlands, assignor, by mesne assignments, to North American Philips Company, Inc., New York, N. Y., a corporation of Delaware Application June 21, 1956, Serial No. 592,843

Claims priority, application Netherlands July 30, 1955

3 Claims. (Cl. 179—18)

This invention relates to arrangements of subscribers' circuits in electronic telephone exchanges.

Circuit-arrangements are already known, in which the cores of a line are connected to a winding on a transformer, the line being fed by a first direct-voltage source. Furthermore, a second winding on the transformer is connected, in series with a resistor, between a first terminal of a second source of supply and a multiplex point, which is coupled via electronic connecting means, more particularly gaseous discharge paths, to a multiplex point in each of a plurality of connecting circuits, the latter multiplex points being connected via an impedance to a second terminal of the second source of supply.

The transformer serves to match the line, which has a comparatively low resistance, to the electronic connecting means which have a comparatively high internal resistance. In devices of known type, a direct current coupling between the two transformer circuits does not exist and signals such, for example, as dialling signals and clearing signals must be transmitted via the transformer in the form of pulses. This method has the disadvantage that the strength of the transmitted pulses is dependent upon the electrical properties of the line, such, for example, as the resistance and the capacitance. This is connected with the fact that the transformer transmits only variations in the current through the line loop, in other words differentiates so-to-say this current. The form of the flanks of the pluses produced when the line is opened and closed, is rather greatly dependent upon the said electrical properties, so that the height of the pulses transmitted by the transformer may also vary to a comparatively great extent.

When it is endeavoured to solve this diffculty by signalling with direct current and the two transformer circuits are coupled together by means of a common resistor, the disadvantage is involved that the direct voltage variations transmitted via the electronic connecting means when the direct current in the line varies, are comparatively small. This is attributable to the fact that the common resistance must be comparatively low, since otherwise the direct current in the line, which is several times greater than the direct current in the second winding on the transformer, would be unduly limited.

In the circuit-arrangement according to the invention, a rectifier connected in series with the second winding on the transformer, also forms part of the direct-current circuit of the line, the direct current supplied by the line supply source being active in the direction of passage of the rectifier and the direct current flowing through the second winding on the transformer being active in the blocking direction thereof. Furthermore, the rectifier is shunted by at least one further resistor.

In order that the invention may be readily carried into effect, one embodiment will now be described, by way of example with reference to the accompanying drawing.

In the figure, a subscriber's set AB is connected via line wires L1 and L2 to ends of two equal windings T1 and T2 on a transformer T in a subscriber's circuit LS.

The two other ends of said windings are connected together via a capacitor C1, which constitute a short-circuit for telephone currents. The line circuit is fed by a battery BA1 having a voltage of, for example, 60 volts. The negative terminal of battery BA1 is connected, via a resistor R1, to one end of winding T1, the positive terminal being connected to earth. One end of winding T2 is connected to earth via the series-combination of a rectifier G and a resistor R2. When the line loop is closed, direct current can thus flow from earth via resistor R2, rectifier G, winding T2, line wire L2, the subscriber's set AB, line wire L1, winding T1 and resistor R1 to the negative terminal of battery BA1. The strength of this current is, for example, 50 mamps. One end of winding T3 on transformer T is connected, via a capacitor C2, to earth, a direct-current path to earth being formed via a resistor R3, rectifier G and resistor R2. The series-combination of rectifier G and resistor R2, which is shunted by a high-ohmic resistor R4, thus forms part of the described direct-current circuit via the line loop and of the direct-current circuit, still to be described, via the winding T3. The other end of winding T3 is connected via multiplex point M1 to the cathodes *k* of a plurality of gas-filled tubes B, of which only one is shown, and the anodes *a* of which are connected via multiplex points M2 to line wires SG in a plurality of connecting circuits VC, of which likewise only one is shown. The line wires SG are connected via an inductance L and a resistor R7 to the positive terminal of a second source of supply BA2 having a voltage of 160 volts and the negative terminal of which is connected to earth. The ignition electrode *f* of the gas-filled tubes B is connected to a tapping point on a potentiometer R5, R6, R7 which is connected between the positive terminal of battery BA2 and one of the outlets U1, U2, U3 etc. of a counter circuit TS, shown diagrammatically. The counter circuit TS serves to receive dialling pulses and is controlled by the voltage of the junction between inductance L and resistor R7. In the rest condition of the circuit, the gas-filled tubes B are cut-off and the voltages of the outlets U1, U2, U3, etc. of the counter circuit TS are low, the ignition electrode *f* receiving a voltage of about 60 volts, which voltage is slightly lower than the ignition voltage between the electrode *k* and the ignition electrode *f*. The connecting circuit VC is coupled in a similar way via gas-filled tubes B to the circuits of other subscribers.

The circuit arrangement operates as follows:

When a subscriber for the purpose of calling takes up the receiver, the afore-mentioned direct-current circuit extending from earth via resistor R2, rectifier G, winding T2, line wire L2, subscriber's set AB, line wire L1, winding T1 and resistor R1 to the negative terminal of battery BA1 is closed. The voltage on point P then decreases to about —30 volts, so that the voltage between the cathode *k* and the ignition electrode *f* of the gas-filled tubes connected to the multiplex point M1 increases to the ignition voltage. As soon as one of the tubes starts to ignite, a direct current flows from the positive terminal of battery BA2 via resistor R7, inductance L, line wire SG, multiplex point M2, the discharge path between anode *a* and cathode *k* of the gas tube B, multiplex point M1, winding T3, resistor R3, rectifier G and resistor R2 to earth. This results in a voltage drop across resistor R3, so that the voltage on the multiplex point M1 increases to a value such that the other tubes cannot ignite. The pulse which is transmitted via transformer T, when the line loop is closed, is damped by a resistor X, variable with voltage, which is connected in parallel with the winding T3. Gas-filled tubes B connecting the line circuit LS to a busy connecting circuit VC cannot be ignited since direct current flows via the resistor R7 in this connecting circuit and ignition electrode *f* of the gas tube concerned thus has a lower voltage. Due to the voltage drop across resistor R7, the occupied connecting circuit VC is thus marked busy. The voltage on the multiplex point M2 is then approximately 90 volts. The current flowing through the gas-filled tube B is approximately 10 mamps. and has in resistor R2 an oposite direction to the current which is produced in this resistor by the battery BA1 and which is about 50 mamps. Due to the voltage drop which occurs across resistor R3, multiplex point M1 has a higher potential than that in the free condition of the subscriber's line, so that this line is likewise marked busy.

Subsequently, the subscriber AB dials the number desired, for example the figure 3, the line loop then being interrupted thrice. During a dialling pulse, the current via resistor R2 which is supplied by battery BA1, disappears and rectifier G is cut off, since the current through gas-filled tube B flows in the blocking direction of rectifier G. In order to prevent the current through gas-filled tube B from being interrupted completely and the existing connection with connecting circuit VC being interrupted resistor R4 is connected in parallel with rectifier G and resistor R2. Consequently, during a dialling pulse, a small current continues to flow via resistor R7, inductance L, gas-filled tube B, winding T3 and the resistors R3 and R4. The voltage on multiplex point M2 then increases to about 130 volts.

If the rectifier G would have been absent the voltage variation in multiplex point M2 would have been only about 15 volts. Such a comparatively small voltage variation is not particularly suitable in practice, since in this case satisfactory operation of the circuit may be endangered in connection with tolerance requirements of gas-filled tubes B, resistors, supply voltages and the like, which requirements can frequently be fulfilled with difficulty only. The dialling pulses are received by the counter circuit TS, which as a function of the dialled figure increases the voltage of the outlet U3 to a value such that the ignition electrode, connected to this outlet of the gas-filled tube, which couples the connecting circuit VC to the line of the desired subscriber, may cause ignition of this tube, if the line concerned is free. In this case, a ringing current is supplied to the line of the called subscriber with the use of means not shown further. After this subscriber has taken up his receiver, the subscribers can talk to one another via the line wires L1 and L2, transformer T, the gas-filled tube B in each line circuit and the line wire SG in the connecting circuit VC. When the call is over, the subscribers replace their receivers, so that the voltage on the multiplex point M2 again increases to a high value and means (not shown) are actuated for extinguishing the gas-filled tubes. If desired, difference may be made between the dialling pulses and the clearing signal by utilising the fact that the dialling pulses bring about interruption of the line loop for a short period only, whereas a clearing signal brings about permanent interruption, so that use may be made of a bridging relay circuit, as is common practice in automatic telephone systems. Furthermore, a marginal difference may be created between dialling pulses and the clearing signal by shunting the dial contact in the subscriber's set AB by means of a resistor, so that during dialling the line loop is not interrupted completely and a certain current continues to flow. This resistance may, for example, be given a value such that during dialling, the voltage on multiplex point M2 increases from 90 volts to 120 volts, during each dialling pulse the voltage on the multiplex point increases to 150 volts when the line loop is opened completely and hence the connection is completed. The connecting circuit VC then includes a device for restoring the circuit to its rest condition when a call is over, the device reacting upon the increase in potential of multiplex point M2 to above a determined threshold value, for example 135 volts.

What is claimed is:

1. A subscriber's circuit for an electronic telephone exchange, comprising a transformer having a plurality of windings, a subscriber's line having conductors connected to at least one of said windings, a first direct-voltage source connected to said line, a first multiplex point, a second direct-voltage source, a resistance, means connecting said resistance in series with another of said windings between said multiplex point and a terminal of said second source, a plurality of connecting circuits each having a multiplex point and an impedance connected between the multiplex point thereof and the remaining terminal of said second source, electronic connecting means connected between said first multiplex point and the multiplex points of said connecting circuits, a rectifier and a resistor connected in parallel combination, and means connecting said parallel combination jointly in the current paths of both of said direct-voltage sources, said first direct-voltage source being polarized in the current-passing direction of said rectifier, and said second direct-voltage source being polarized in the blocking direction of said rectifier.

2. A circuit as claimed in claim 1, including a resistor connected between said parallel combination and an end of said other winding.

3. A circuit as claimed in claim 1, including a subscriber's set connected to said subscriber's line and having a dial contact, and a resistor connected in shunt with said dial contact.

References Cited in the file of this patent

UNITED STATES PATENTS

| | | |
|---|---|---|
| 2,715,656 | Andrews | Aug. 16, 1955 |
| 2,766,326 | Beesley | Oct. 9, 1956 |
| 2,773,934 | Trousdale | Dec. 11, 1956 |